United States Patent [19]

Horváth et al.

[11] Patent Number: 4,991,660
[45] Date of Patent: Feb. 12, 1991

[54] ROLLING HOE

[75] Inventors: Benedek Horváth; Cecilia R. Horváthné, both of Kecskemét; Ferenc Zöld, Jakabszállás, all of Hungary

[73] Assignee: Agrikon Mezogazdasagi Gepgyarto Uzletag, Hungary

[21] Appl. No.: 398,627

[22] Filed: Aug. 25, 1989

[30] Foreign Application Priority Data

Sep. 8, 1988 [HU] Hungary ............................. 4621/88

[51] Int. Cl.⁵ .............................................. A01B 21/02
[52] U.S. Cl. ................................... 172/551; 172/556; 172/540
[58] Field of Search ............... 172/177, 518, 540, 544, 172/548–551, 556

[56] References Cited

U.S. PATENT DOCUMENTS

| | | | |
|---|---|---|---|
| 957,722 | 5/1910 | Walker | 172/551 X |
| 2,388,553 | 11/1945 | Kraus | 172/556 |
| 2,419,717 | 4/1947 | Karl | 172/556 |
| 2,882,982 | 4/1959 | Hobbs | 172/551 X |
| 3,217,813 | 11/1965 | Koemel | 172/540 X |
| 3,232,356 | 2/1966 | Whitesides | 172/548 |
| 3,306,371 | 2/1967 | Bush | 172/540 |
| 3,452,826 | 7/1969 | Lehman | 172/551 |
| 3,766,988 | 10/1973 | Whitesides | 172/548 |
| 4,646,850 | 3/1987 | Brown et al. | 172/551 |
| 4,817,732 | 4/1989 | Brown | 172/548 |

*Primary Examiner*—Randolph A. Reese
*Assistant Examiner*—Jeffrey L. Thompson
*Attorney, Agent, or Firm*—Handal & Morofsky

[57] ABSTRACT

A rolling hoe apparatus having a hub, shaft, bearings and a plurality of cultivating teeth, arranged into at least one hoe wheel and suspended from a bearing structure such that the axis (15) of rotation of the hoe-body (3) encloses an angle with the normal to the ground-surface in a range of 0°–75° when viewed in the plane of direction of advance (19), while the lateral tilting of the hoe-wheel with respect to the plane perpendicular to the direction of advance (19) lies in the range between 3° and 75°, wherein the teeth (7) are arcuated and extend radially from the hub and are bent backwards in relation to the natural sense of rotation (14) during cultivation and are arranged so that in course of hauling they penetrate into the soil (24) and perform a motion crossing the direction of progress, and that the symmetry axis (25) of the cross-section (16) of the teeth (7) penetrating into the soil is adjusted so in relation to the axis of rotation (25), that at the moment of reaching the soil (24) a vertical motion is performed, that means that the angle ($\alpha$) enclosed by the plane of rotation (26) of the hoe-wheel (6) and the soil-surface is equal to the angle ($\gamma$) enclosed by the symmetry axis of the tooth-cross-section (16, 16a) and the axis of rotation.

6 Claims, 4 Drawing Sheets

ROLLING HOE

FIELD AND BACKGROUND OF THE INVENTION

The invention relates to a rolling hoe (rotary hoe body) which is primarily a soil cultivating rotary machine being suitable in particular for loosening the soil, weed control, breaking up of clods, as well as for performing basic activities of soil cultivation.

In the course of the development of soil cultivating machines as a result of the interaction between technical level and agrotechnic knowledge, most different cultivating tools have been developed and spread in a wide circle. Magnitude of the profit to be gained in agricultural production determines the type of the commonly used tools based upon the known solutions under the given conditions.

In order to achieve satisfactory yields a properly compacted and sedimented seed-bed, with proper structure and free of weeds, has to be prepared.

Later on, weeds are to be uprooted in the spaces between the rows and the soil surface has to be aerated by loosening the soil in a depth of 2 to 6 cm. Stems of plants left in the soil are to be covered with earth. Soil ameliorating agents, including herbicides, are to be mixed with the soil. These operations require a plurality of machines, that means that several independent machines have to be set on the soil following one another. At the same time a further requirement lies in using soil cultivating machines which are able to perform simultaneous operations without deteriorating soil structure.

Operation of several machines requires a high expenditure on costs. Due to the repeated operative steps, machines require considerable hauling force.

Accordingly, specialized soil cultivating machines are required. The cultivating tools of these machines enable the performance of a plurality of cultivating operations in one single operative step.

From technical literature, patent specification and practice several solutions are known, which are more or less suitable for fulfilling the tasks set.

As such let us mention the U.S. Pat. Nos. 3,650,334, DE U.S. Pat. No. 1,457,716 and DE U.S. Pat. No. 1,457,714. These specifications deal with rotary hoes consisting of a central hub and of the radially extending teeth, which are bent backwards in relation to the natural sense of rotation in course of cultivation.

A common characteristic of the aforementioned solutions lies in that the axis of rotation of the hoes is running parallel with the soil surface.

Hoe-wheels form units, groups of hoes rotating on a common shaft. Axis of rotation of the hoe-groups is set at an angle deviating from 90° in respect to the direction of advance.

A further common characteristic lies in that they are suitable only for loosing up the soil between the rows.

As a further deficiency it can be mentioned that the width of the soil zone which might be cultivated is relatively inconsiderable, the mass of the cultivator is large and manipulation is rather wearisome. Otherwise these machines do not meet functional requirements of soil cultivation.

Due to the considerable mass, teeth are frequently broken and the ability of penetration of the teeth into the soil is unsatisfactory. Weed control does not comply with the prescriptions of relating standards.

A solution more worthy of attention can be recognized from the U.S. Pat. No. 3,766,988.

The cross-section of the teeth is shaped so that these are able to penetrate into the soil vertically.

In order to avoid breaking of teeth, in accordance with the DE U.S. Pat. No. 2,528,928, the hoe-wheels are individually suspended.

Summing up what has been said about the rotary hoes, it can be stated that these are used within a most narrow range for performing special tasks of soil cultivation.

As such a task, consider breaking of the 1-2 cm thick surface soil layer preventing shooting up of seedlings, extermination of shooting up weeds, aeration of soil in between the rows, weed control in the space between two rows and building up ridges of small size on loose soil. In agricultural production all these applications do not surpass 1-2% of the total working time expended on soil cultivation. That means that proportion of activity of cultivating bodies with rotary hoes is presently inconsiderable.

Other cultivating tools are of different types and effectuation.

It is characteristic for operation, in so far as different loosening tools are used for loosening the soil, that ploughs and cultivating tools with discs cover plant stems left behind with earth, different cylinders are compacting the soil and ridges are filled up with filling hoe bodies. Weed control is realized by using cultivator hoes, furrows are broken up with cylinders serving for this purpose, stems have been left behind, and clods are comminuted with special cutting discs and cultivating means provided with discs, weeder and soil-ameliorating agents are mixed into the soil by means of tools provided with discs or cutting spades, etc.

In connection with said cultivating means it can be stated that beside the advantageous features, significant disadvantages appear. If these could be eliminated, considerable economic profit could be achieved.

When plough and soil cultivating means provided with discs turn the soil, moisture balance of the cultivated soil will be negatively influenced. Loosening means and cultivator hoes collect weeds and remnants of plant stems, twigs etc., so they often get clogged. Cultivator hoes serving for weed control have to be sharpened daily, or every second day, by manual forging or in any other way known in itself, as otherwise they do not penetrate into the soil.

With the exception of ploughs, the majority of cultivating means may be operated in the range of low soil moisture with advantageous parameters. Formation of ridges from smaller furrows can be realized with known soil cultivating means with difficulty only and at high costs. It is wearisome to control weeds on the sides of the ridge, loosening the earth, covering remnants of plant stems with earth and mixing with earth.

It is an unsolved problem to prepare "properly sedimented soil conditions" prior to sowing.

OBJECT AND SUMMARY OF THE INVENTION

The aim of the invention is not only to eliminate deficiencies of known solutions and to render said means suitable for more advantageously utilizing the scope of application and with better parameters, but to develop a universal multi-functional tool for soil cultivating which is well suited for the equivalent replacement of a large part of the presently used cultivating means, while additionally eliminating known deficiencies.

Accordingly, a soil cultivating tool is required that is energy saving and suitable for several soil types. It should be able to simultaneously perform several agrotechnical tasks without being clogged. A further requirement lies in satisfactory weed control, clods should be well comminuted, soil should be mixed well, it should be suitable for covering remnant plant stems with earth, for levelling, soil compacting and building up ridges. Teeth should have a long useful life, they could be exchanged and should be protected against breaking in case of getting stuck.

Summing up what has been said, the invention relates to a rolling hoe, in particular for realizing the basic functions of soil cultivation. It can be characterized in that the hoes are individually suspended from the bearing structure so that retroversion of the axis of rotation of the hoe-body, with respect to the perpendicular to the soil surface, amounts to 0° to 75° in direction of advance, while in the plane running perpendicularly to the direction of advance lateral tilting amounts to 3° to 75°.

The hoe-body wheel comprises a hub and several arcuated teeth which extend radially from said hub. In comparison to natural sense of rotation during work performance, the teeth are bent backward. Teeth are arranged so that in the course of hauling or penetrating into the soil, a motion should be performed crossing direction of advance. The position of the blade penetrating into the soil is adjusted so that in relation to the axis of rotations, in the moment of reaching soil the surface cut takes place expediently vertically, that means that the angle enclosed by the plane of rotation of the hoe-wheel and the soil surface corresponds to the angle enclosed by the symmetry axis of the teeth cross-section and the axis of rotation.

According to an advantageous embodiment, cutting blades of the teeth of the rolling hoe are lying along a plane or the mantle surface of some body of rotation.

The solution is considered as advantageous with which the arch of the teeth forms an involute and the teeth are fixed with a releasable bond in the hub.

The solution is also considered as advantageous where the tooth has a trapezoid cross-section with a symmetric formation, and after one edge gets worn, it can be turned, being suitable for right-sided and left-sided hoe-wheels.

It is also considered as advantageous if several similar individually suspended wheels of the rolling hoe are mounted onto a common bearing construction, wherein between the individually suspended hoe-wheels and the bearing construction serving for suspending there is an elastic adjustable connection.

BRIEF DESCRIPTION OF THE DRAWINGS

The invention will be described by the aid of a preferred embodiment, with reference to the drawings enclosed, wherein.

DESCRIPTION OF THE PREFERRED EMBODIMENT

Figure 1:
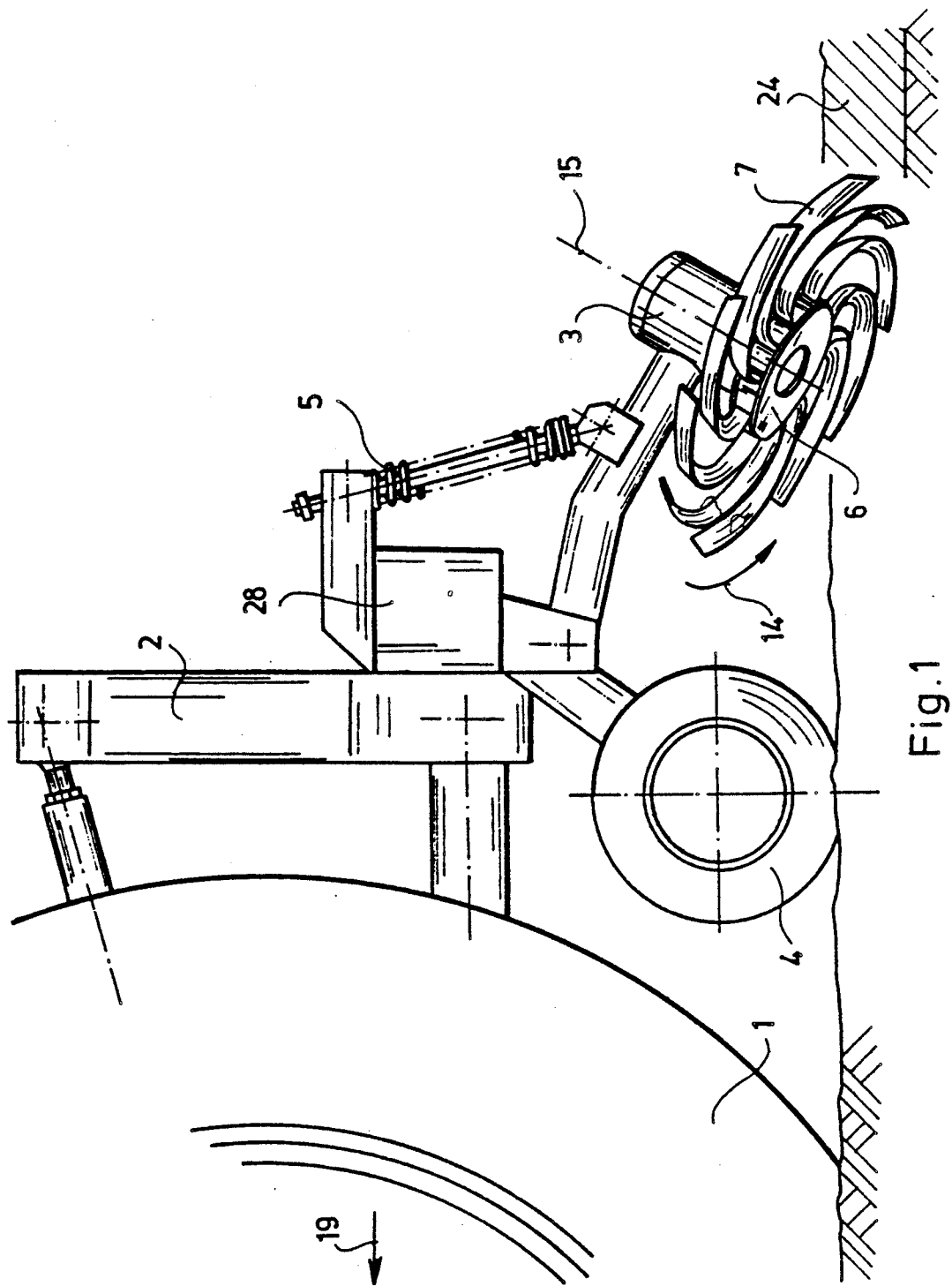
FIG. 1 illustrates the connection between hoe-body, working machine and power unit

FIG. 1 illustrates the expedient connection of a hoe-body 3 to a working machine 2 and a power machine 1. In respect to the possible modes of connection of the hoe-body 3 on a bearing construction 28 the requirement lies in that angular position, in relation to the direction of advance 19 and the soil surface, should be kept on a constant value, the hoe-body should be suitable for following unevenness of the soil in the vertical direction, without any change of the angular position, furthermore, if it gets obstructed it should emerge from the soil 24 to avoid breaking of the teeth and after having passed the hindrance it should return automatically in its original position of work performance.

In case of the mode of connection, as discussed here, following of unevenesses of the soil is enabled by a wheel 4 and in case of getting stranded, breaking will be avoided by the aid of a spring 5 and the mechanism according to FIG. 1.

Figure 2:
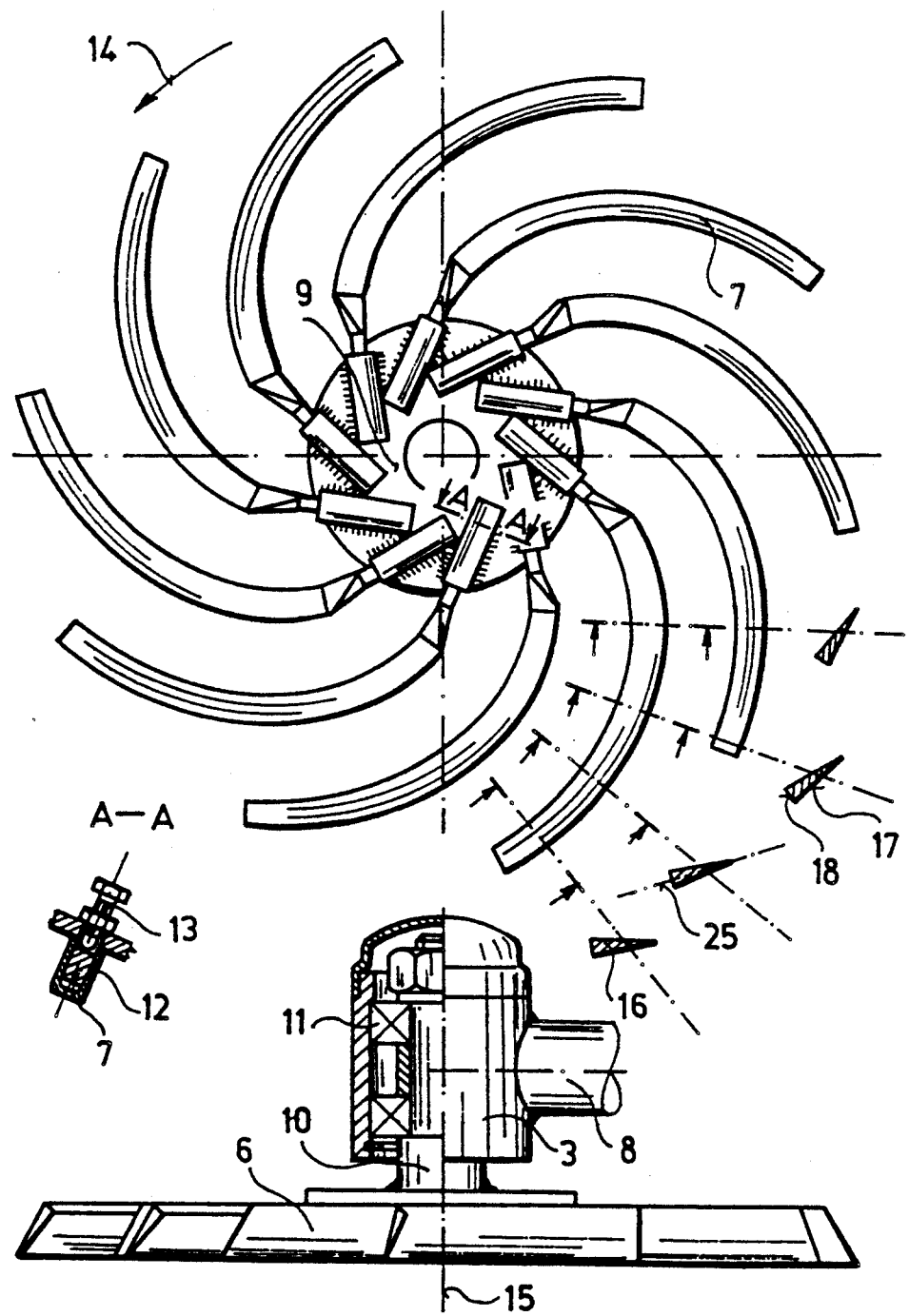
FIG. 2 illustrates the structural layout of the hoe-body with the cross-section of teeth, FIGS. 3, 3a and 3b each illustrates different views of the hoe-body and its working positions

FIG. 2 illustrates the structural layout of the hoe-body and cross-section of a teeth 7.

Hoe-wheel 6 is connected to the working machine via a hub 8. The figure also illustrates the expedient support in bearings of the hoe-wheel 6, wherein a hub 9 of the wheel, a shaft 10 and the teeth 7 installed into the hub 9 form a structural unit, which are able to turn in the bearings in the hub.

The hoe-wheel 6 includes the wheel-hub 9 and a plurality of teeth 7, which are extending from the wheel-hub 9. There is an equal distance in between the teeth and the edges thereof are lying along the generatrix of some body of rotation.

Every tooth 7 is arcuated and bent in a direction being opposite to the sense of rotation of the hoe-wheel 6 caused by the soil.

The distance between the teeth of the hoe-wheel 6 is expediently widening, starting from the wheel-hub 9 in direction of the outer diameter.

The arcuated bent teeth 7 having a cross-section 16 falling into the plane of the axis 15 of rotation and form along the length of the teeth 7 isosceles triangles, wherein width of the tooth 17 forms the equal shanks of the isosceles triangle and the height of the tooth 18 forms the shorter shank of the triangle.

The edges of the teeth 7 are formed by the shanks of the isosceles triangle, these are forming always an acute angle of the edges are formed so as to be suitable for cutting.

The hoe-wheel 6 being able to penetrate into the soil is formed so that magnitude of the angle $\gamma$ enclosed by the axis of rotation of the hoe-wheel 6 and the symmetry axis 25 of the cross-section 16 corresponds to the angle $\alpha$ enclosed by the soil surface and the plane 26 of rotation of the hoe-wheel 6. ($\alpha = \gamma$ FIG. 3).

In respect to repair it is considered as advantageous that the teeth 7 of the hoe-wheel can be exchanged. FIG. 2 illustrates an advantageous mode of fixing of the teeth, they are fixed by means of connecting clevises 12 and fixing screws with a counter-nut 13.

Figure 3:
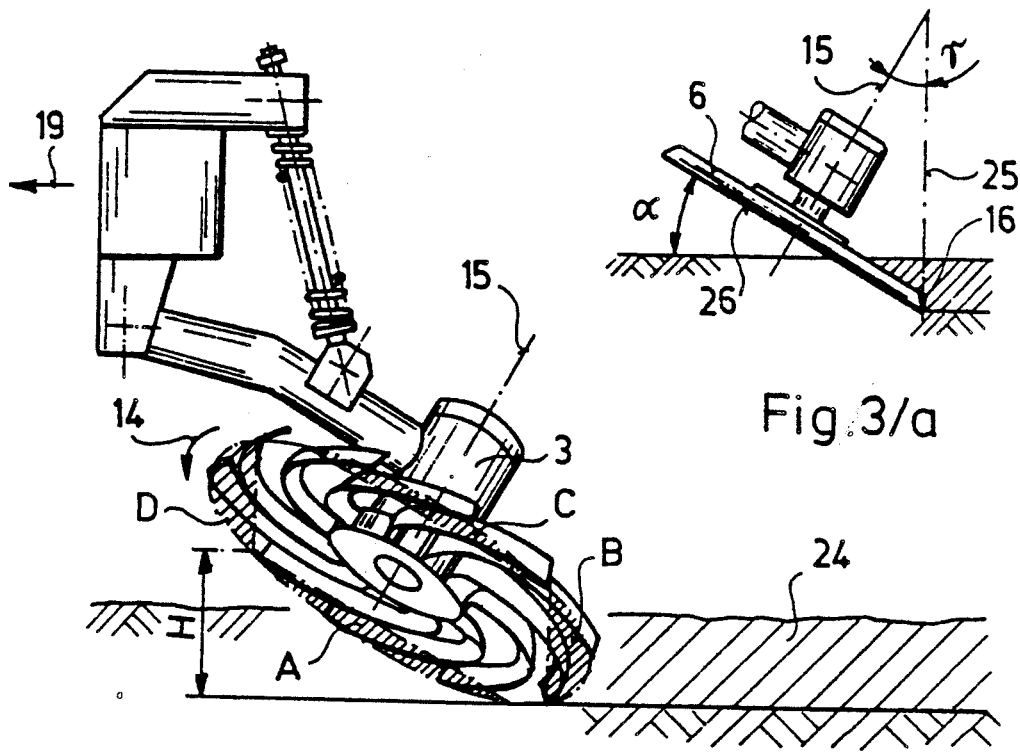
Figure 3:
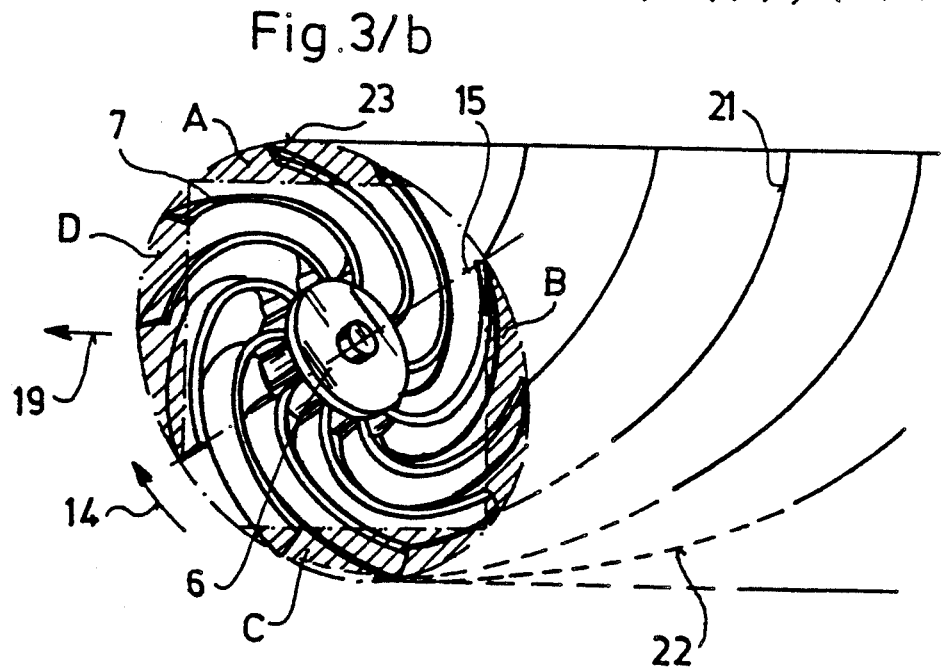

FIGS. 3, 3a and 3b each illustrates different views of the hoe-body 3 and the working positions. Working machine 2 is hauled by the power machine 1 into the direction 19 of advance. Upon hauling the hoe-wheel is put in a rotary motion, upon this effect the teeth 7 are splitting the soil.

Motion of the tooth 7 crossing the direction 19 of hauling on the soil 24 is caused by the arrangement, in so far as axis 15 of rotation of the hoe-wheel 6 encloses an angle of 0°–75° (expediently 30°) with the normal to the soil surface, i.e. it is tilting back, while with respect to the plane being normal to the direction 19 of advance it is tilting to the side at 3°–75° (expediently 20°).

The hoe-body 3 is able to perform agrotechnic functions by means of the relative spatial motion of the teeth 7.

Figure 4:
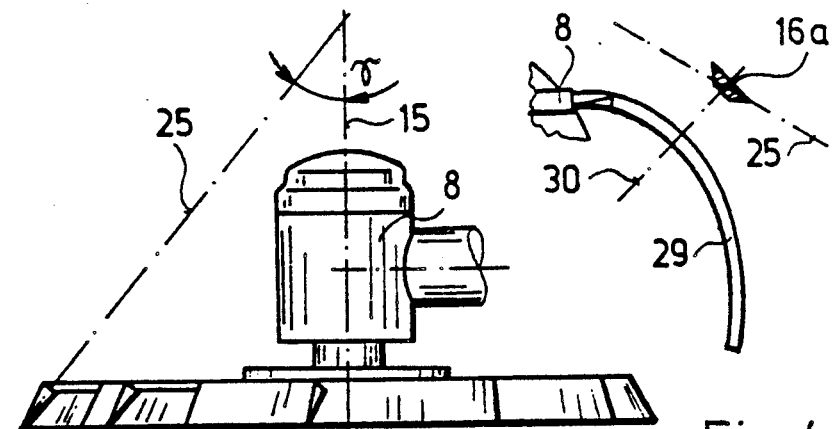
FIG. 4 depicts motion conditions of the hoe-body and FIG. 4/a illustrates the turnable and universal (right-sided and left-sided) tooth-construction.
Figure 4:
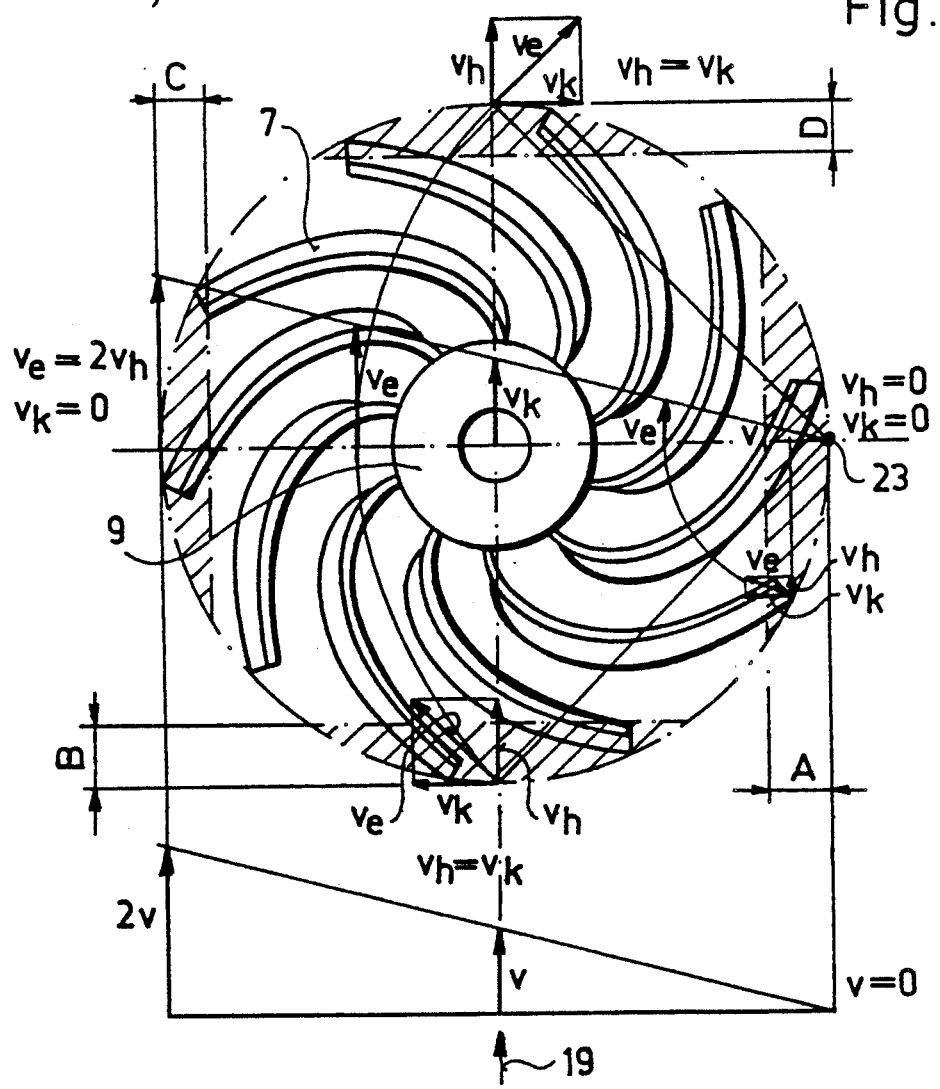

According to experiences gained in course of tests, the hoe-wheel 6 rolls on the soil 24 along the outer diameter defined by the tips of the teeth 7 (see FIG. 4).

Accordingly, momentary center 23 of the motion of the hoe-wheel 6 can be found along the outer diameter, on the side of the teeth 7 of the hoe-wheel 6 contacting the soil 24, at the point lying the farthest from the axis of rotation.

FIG. 4 illustrates conditions of motion of the hoe-wheel 6. Motions of the hoe-wheel 6 in relation to the soil 24 are determined by the position of the momentary center 23. In the zone indicated with "A" the displacement of the points of the hoe-wheel 6 in the direction 19 of advance is negligable small. Between entering and leaving the zone "A" the teeth 7 travel the path "H" vertically, being a most considerable displacement (see FIG. 3).

Accordingly, it can be stated that in the zone "A" the teeth are moving practically in a vertical direction. This circumstance determines work performance of the hoe-wheel 6 and expedient structural formation of the teeth 7.

Teeth 7 moving vertically cut remnant plant stems, roots of plants and clods, supposing that resistance of the soil suffices as reactive force.

In the case soil 24 has a loose structure, plant stems are not cut, but teeth 7 press the stems into the soil.

In case of clods the situation is the same. Clods being pressed into the soil 24 are compacting the layer below cultivation and homogenize soil structure.

In the zone "B", as a consequence of turning of the hoe-wheel 6 displacement of the teeth 7 in direction of advance and crosswise is ever increasing, as a consequence the tooth 7 is splitting the soil 24 (direction of advance 19 will be intersected by the transverse motion 21). Meanwhile roots of plants are cut, the soil 24 is loosened and mellowed, thereafter it emerges vertically from the soil and leaves plant stems covered with earth in the soil.

Turning of the teeth 7 and displacement of edges cut and split the clods, thus increasing efficiency of comminution.

Motion of the teeth 7 from the momentary center 23 can be characterized by continuous acceleration.

This fact is the basis of the satisfactory self-cleaning ability of the hoe-wheel 6.

That means that the zone "C" represents the zone of self-cleaning, wherein relative to the soil surface, in direction of advance the tooth 7 is moving with a double speed of advance, $V_e = 2 V_h$ and it is lifted vertically from the soil.

In the zone "D" teeth 7 are crossing the resultant direction of motion $V_e$, in such a manner it becomes possible to tumble down standing weeds and to level and mix the soil.

Momentary conditions of motion of the hoe-wheel 6 will be defined by the relative position of the points to the momentary center 23. Mode of construction of the magnitude, direction and sense of the resultant velocity $V_e$ of the motion of the point of the hoe-wheel becomes obvious from FIG. 4.

Resultant velocity $V_e$ can be divided into two components, one in direction of progress $V_h$ and one in crosswise direction $V_k$.

FIG. 4 illustrates the resultant motion conditions of some notable peripheral points, as well as the relative values of the components of the velocities $V_h$ (direction of progress) and $V_k$ (cross-wise direction).

Character and quality of the agrotechnic tasks to be performed will be influenced by the angle $\alpha$ enclosed by the plane of rotation of the hoe-wheel 6 and the soil surface.

If the value of the angle $\alpha$ is low, working depth to be achieved by the hoe-wheel 6 will be low too, a larger angle $\alpha$ will proportionally increase working depth.

At a low value of the angle $\alpha$ and low tooth-width 27, the soil-guiding effect will be low too, at a larger point $\alpha$ and larger tooth-width 17 the hoe-wheel 6 will be well suitable for the function of filling-up. With increasing $\alpha$ soil-mixing effect also increases. Agrotechnic tasks to be performed depend also on the cross-section 16 of the teeth and the position thereof.

Magnitude of the angle $\alpha$ enclosed by the plane of rotation 26 of the hoe-wheel 6 and the soil surface corresponds to the angle $\gamma$ enclosed by the symmetry axis 25 of the tooth-cross-section 16 and the axis 15 of rotation.

If the angle $\alpha$ is larger than the angle $\gamma$, then ability of penetration of the tooth 7 into the soil increases, again, if the angle $\alpha$ is less than the angle $\gamma$, penetration into the soil becomes more difficult, simultaneously compacting effect increases. Penetration into the soil will be influenced by the sharpening angle of the tooth 7 and edge thickness.

With low edge thickness and a low sharpening angle the compacting effect decreases, penetration will be satisfactory. At a larger sharpening angle penetration deteriorates and compacting effect increases.

In FIG. 4/a a tooth 29 is seen, which has a trapezoidal cross-section 16/a. This formation enables receipt of the tooth 29 in the hub 8.

Summing up the advantages of the invention it can be stated that a universal cultivating tool has been obtained which is suitable for performing a plurality of soil cultivating tasks, simultaneously eliminating the deficiency of known solutions. The rolling hoe - having been used up to now practically in a rather restricted circle, has been rendered suitable for fulfilling nearly all the tasks of soil cultivation.

As already mentioned, the rolling hoe according to the invention eliminates deficiencies of known soil cultivating means, operation without clogging becomes possible and weed control can be well regulated. Due to its efficient ability in breaking-up clods the rolling hoes are well suitable for covering remnants of plant stems with earth and mixing them into the soil, when the soil is loose and in a hard soil plant stems are comminuted. The state of compactness of the cultivated soil in a thickness of 20 to 30 cm can be regulated optionally.

The rolling hoe according to the invention is well suitable for cultivation on normal, too dry and too wet soil conditions, a ridge may be formed from small clods, sides of ridges can be loosened, weeds controlled, the space between the rows of hoed plants can be well cultivated, necessity of frequent sharpening of the cultivator hoe may be eliminated and clogging does not negatively affect the culture plants.

As no turning of soil is performed, moisture of the soil can be maintained, operation with maximal safety becomes possible, application is economical and energy saving, at the same time soil compaction caused by superfluous operation can be prevented and as a consequence advantageous soil formation becomes possible.

We claim:

1. A rolling hoe apparatus for cultivating soil comprising:
    a frame supporting at least one rotary hoe wheel, each said hoe wheel comprising a hub, a shaft, bearings and cultivating teeth,
    each said hoe wheel being individually suspended from said frame through a bearing structure for allowing said hoe wheel to be flexible in a vertical direction,
    said cultivating teeth comprising a plurality of arcuate teeth each having an elongated cutting edge and each extending radially outwardly from said hub and curving rearwardly with respect to the normal direction of rotation during cultivation, said teeth being arranged substantially equally spaced about the circumference of said hub,
    characterized by said hoe wheel having a plane of rotation during cultivation extending generally forwardly and upwardly forming an angle ($\alpha$) with the soil surface, wherein the magnitude of said angle ($\alpha$) is between 5 and 75 degrees, and by said teeth each having an axis of symmetry when viewed in cross-section which forms an angle ($\gamma$) with the axis of rotation of the hoe wheel, wherein during cultivation the magnitude of the angle ($\alpha$) between the plane of rotation of the hoe wheel and the soil surface is approximately equal to the magnitude of the angle ($\gamma$) between the axis of symmetry of each tooth and the axis of rotation of the hoe wheel.

2. A rolling hoe apparatus as claimed in claim 1, characterized in that the cutting edges of said plurality of teeth (7) are coplanar with each other.

3. A rolling hoe apparatus as claimed in claim 1, characterized in that each of said arcuate teeth (7) is involute and said teeth are fixed in the hub (9) with a releasable bond.

4. A rolling hoe apparatus as claimed in claim 1, characterized in that each of said teeth (7) has a trapezoidal cross-section (16a) and is symmetrically shaped so that after the abrasion of the edges the hoe wheel can be turned and be suitable for use as either a right-sided or left-sided hoe-wheel (6).

5. A rolling hoe apparatus as claimed in claim 1, characterized in that several similar hoe-wheels (6) are suspended individually from a common frame (28).

6. A rolling hoe apparatus as claimed in claim 5, characterized in that between the single individually suspended wheels (6) of the rolling hoe and the frame (28) there is an adjustable, spring biasing means (5).

* * * * *